(12) United States Patent
Kondo et al.

(10) Patent No.: US 10,843,607 B2
(45) Date of Patent: Nov. 24, 2020

(54) HEADREST AND VEHICLE SEAT

(71) Applicant: Toyota Jidosha Kabushiki Kaisha, Toyota (JP)

(72) Inventors: Keiichi Kondo, Chiryu (JP); Keiichiro Inoue, Toyota (JP); Keita Iwasaki, Toyota (JP); Osamu Kanayama, Toyota (JP); Masato Suzuki, Okazaki (JP); Kento Yoshida, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/420,652

(22) Filed: May 23, 2019

(65) Prior Publication Data

US 2019/0359105 A1 Nov. 28, 2019

(30) Foreign Application Priority Data

May 28, 2018 (JP) ................................ 2018-101833

(51) Int. Cl.
*A47C 1/10* (2006.01)
*B64D 11/06* (2006.01)
*B60N 2/853* (2018.01)
*B60N 2/829* (2018.01)
*B60N 2/865* (2018.01)
*B60N 2/80* (2018.01)

(52) U.S. Cl.
CPC ............ *B60N 2/853* (2018.02); *B60N 2/829* (2018.02); *B60N 2/865* (2018.02); *B60N 2002/899* (2018.02); *B60N 2205/30* (2013.01)

(58) Field of Classification Search
CPC .......... B60N 2/809; B60N 2/865; B60N 2/80; B60N 2/818; B60N 2/806; B60N 2/829; B60N 2/838; B60N 2/856; B60N 2/812; A47C 7/38
See application file for complete search history.

(56) References Cited

U.S. PATENT DOCUMENTS 6,158,812 A * 12/2000 Bonke ..................... B60R 16/08
297/391
6,805,411 B2 * 10/2004 Gramss .................. B60N 2/865
297/408

(Continued)

FOREIGN PATENT DOCUMENTS

JP 2005305127 A 11/2005
JP 2013189029 A 9/2013

*Primary Examiner* — Shin H Kim
(74) *Attorney, Agent, or Firm* — Dinsmore & Shohl LLP

(57) ABSTRACT

A headrest is provided including an upper pillow section that configures a front side of an upper portion of the headrest, and a lower pillow section that configures a front side of a lower portion of the headrest. A front-rear position of the lower pillow section with respect to the upper pillow section is adjustable by swinging the lower pillow section about a shaft extending along a seat width direction at an upper edge side of the lower pillow section, and a protrusion amount by which respective seat width direction side portions of the lower pillow section protrude toward a seat front side being adjustable with respect to a seat width direction intermediate portion of the lower pillow section by swinging the two seat width direction side portions about a shaft extending in a seat vertical direction.

9 Claims, 10 Drawing Sheets

(56) References Cited

U.S. PATENT DOCUMENTS

| | | | | |
|---|---|---|---|---|
| 7,410,218 B2* | 8/2008 | Kotani | ............... | B60N 2/885 |
| | | | | 297/408 |
| 8,007,045 B2* | 8/2011 | Meiller | ............. | B60N 2/885 |
| | | | | 297/408 |
| RE44,432 E * | 8/2013 | Bartels | ............... | B60N 2/809 |
| | | | | 297/216.12 |
| 2002/0043858 A1* | 4/2002 | Svantesson | ......... | B60N 2/865 |
| | | | | 297/391 |
| 2004/0195893 A1* | 10/2004 | Clough | ............. | B60N 2/885 |
| | | | | 297/391 |
| 2004/0217639 A1* | 11/2004 | Clough | ............... | A47C 7/38 |
| | | | | 297/391 |
| 2005/0253440 A1 | 11/2005 | Kotani et al. | | |
| 2012/0292973 A1* | 11/2012 | Westerink | .......... | B64D 11/062 |
| | | | | 297/391 |
| 2014/0375100 A1* | 12/2014 | Reese | ............... | B60N 2/885 |
| | | | | 297/391 |
| 2015/0097407 A1* | 4/2015 | Duckert | ............ | B60N 2/682 |
| | | | | 297/391 |
| 2016/0023767 A1* | 1/2016 | Zheng | ............... | B60N 2/809 |
| | | | | 297/408 |
| 2016/0046218 A1* | 2/2016 | Worlitz | ............. | B60N 2/976 |
| | | | | 297/406 |
| 2017/0197530 A1* | 7/2017 | Line | .................. | B60N 2/888 |

\* cited by examiner

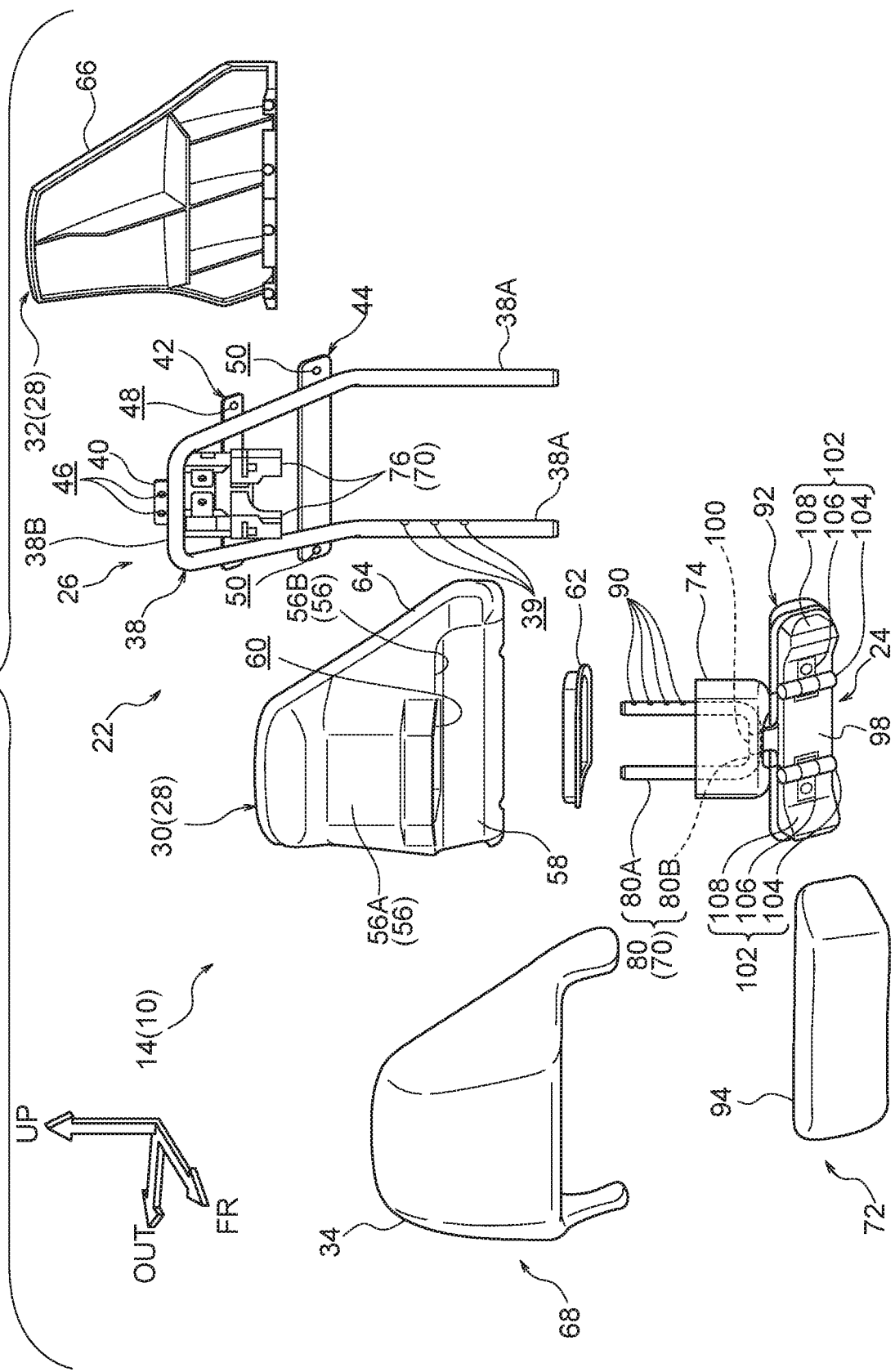

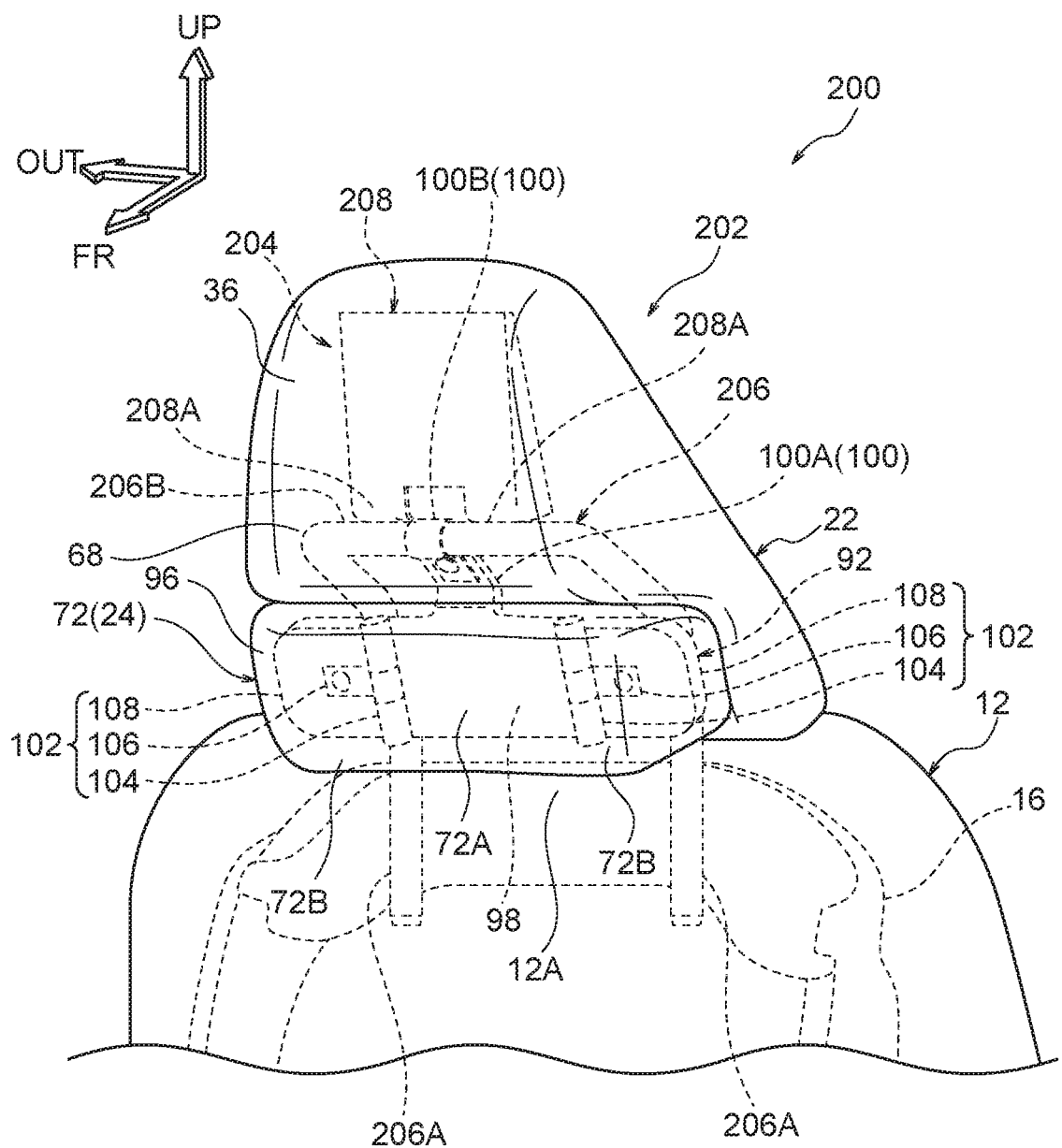

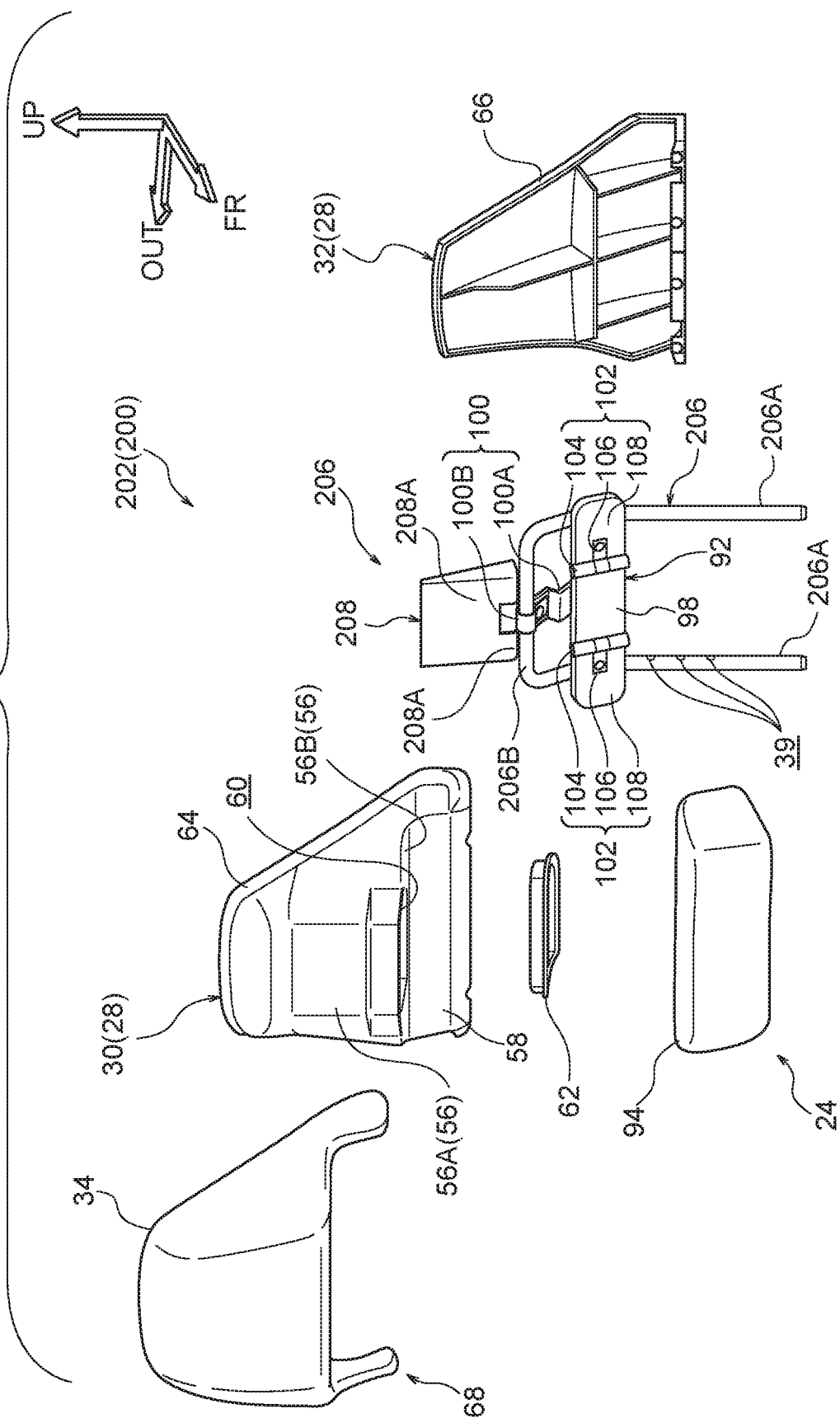

HEADREST AND VEHICLE SEAT

CROSS-REFERENCE TO RELATED APPLICATION

This application is based on and claims priority under 35 USC 119 from Japanese Patent Application No. 2018-101833 filed on May 28, 2018, the disclosure of which is incorporated by reference herein.

BACKGROUND

Technical Field

The present disclosure relates to a headrest and a vehicle seat.

Related Art

In Japanese Patent Application Laid-Open (JP-A) No. 2005-305127, a headrest body of a headrest is coupled to a seatback through a headrest stay (pole), and a neck support section that supports the neck of an occupant from the rear is provided at the lower side of the headrest body. The neck support section is supported by swing arms disposed at two vehicle width direction side faces of the headrest body, and the neck support section is attached so as to be capable of moving forward with respect to the headrest body. The vehicle seat is thereby able to provide good support for the neck of the occupant as required.

However, in order to improve the comfort of an occupant seated in a vehicle seat, it is desirable to support the head of the occupant from below over a wide range, so as to alleviate the burden on the neck from the weight of the head.

Regarding this point, the headrest with the above configuration enables the head of the occupant to be supported from the rear by the headrest body, and the neck of the occupant to be supported from the rear by the neck support section. Thus, to a certain extent an effect of supporting the head from below with the neck support section may be expected. However, since the neck is a location with a narrower lateral width than that of the head, in cases in which the neck is merely supported from the rear by the neck support section, the contact surface area between the neck and the neck support section is reduced. There is accordingly room for improvement regarding this point.

SUMMARY

In consideration of the above circumstances, the present disclosure is to obtain a headrest and a vehicle seat enabling the comfort of an occupant to be improved.

A headrest according to a first aspect of the present disclosure includes an upper pillow section that configures a front side of an upper portion of the headrest and that supports a head region of an occupant from a rear side of a seat, and a lower pillow section that configures a front side of a lower portion of the headrest and that is disposed at a lower side of the upper pillow section. A front-rear position of the lower pillow section with respect to the upper pillow section is adjustable by swinging the lower pillow section about a shaft extending along a seat width direction at an upper edge side of the lower pillow section, and a protrusion amount by which respective seat width direction side portions of the lower pillow section protrude toward a seat front side with respect to an intermediate portion in a seat width direction of the lower pillow section is adjustable with respect to the seat width direction intermediate portion by swinging the respective seat width direction side portions about a shaft extending in a seat vertical direction.

The headrest according to the first aspect of the present disclosure includes the upper pillow section that configures the front side of the upper portion of the headrest and that supports the head of an occupant from the seat rear side, and the lower pillow section that configures the front side of the lower portion of the headrest and that is disposed at the seat lower side of the upper pillow section. The front-rear position of the lower pillow section with respect to the upper pillow section is adjustable by swinging the lower pillow section about the shaft disposed extending along the seat width direction at the upper edge side of the lower pillow section. This enables the front-rear position of the lower pillow section to be adjusted to a position alongside the neck of the occupant, thereby enabling the lower pillow section to be moved to a position where the head of the occupant is supported from the seat lower side by the lower pillow section.

Furthermore, the protrusion amount by which the two seat width direction side portions of the lower pillow section protrude toward the seat front side with respect to the seat width direction intermediate portion of the lower pillow section is adjustable with respect to the seat width direction intermediate portion by swinging the two seat width direction side portions about the shaft extending in the seat vertical direction. This enables the protrusion amount by which the two side portions of the lower pillow section protrude toward the seat front side with respect to the intermediate portion to be adjusted such that the two side portions are alongside the sides of the neck of the occupant. The head of the occupant can therefore be supported from the seat lower side over a wide range, enabling the burden on the neck from the weight of the head to be alleviated, and therefore enabling the comfort of the occupant to be improved.

A headrest according to a second aspect of the present disclosure is the headrest according to the first aspect, wherein a vertical position of the lower pillow section is adjustable with respect to the upper pillow section.

In the headrest according to the second aspect of the present disclosure, the vertical position of the lower pillow section can adjusted with respect to the upper pillow section, thereby enabling the vertical position of the lower pillow section to be adjusted to a position alongside the neck of the occupant. Thus, even if the vertical position of the neck of the occupant when seated differs according to their physical build, the lower pillow section can be precisely moved to a position where the head of the occupant is supported from the seat lower side by the lower pillow section.

A headrest according to a third aspect of the present disclosure is the headrest according to the second aspect, further including a support panel disposed at a seat upper side of the lower pillow section. The support panel is housed within the upper pillow section in a state in which the lower pillow section is positioned in an upper position, and at least part of the support panel is disposed between the upper pillow section and the lower pillow section in a state in which the lower pillow section is positioned further toward the lower side than the upper position.

The headrest according to the third aspect of the present disclosure includes the support panel at the seat upper side of the lower pillow section. The support panel is housed within the upper pillow section in a state in which the lower pillow section is positioned in the upper position, and at least part of the support panel is disposed between the upper pillow section and the lower pillow section in a state in which the lower pillow section is positioned further toward the lower side than the upper position. This enables the support panel to function as a handle when adjusting the vertical position of the lower pillow section, enabling adjustment of the vertical position of the lower pillow section with respect to the upper pillow section to be easily performed. Moreover, in cases in which the vehicle suddenly accelerates or a rear-end collision or the like occurs in a state in which the lower pillow section is positioned further to the seat lower side than the upper position, the support panel also functions as member that supports the head of the occupant attempting to move toward the seat rear side due to inertial force. This enables a wide range from the head to the neck of the occupant to be stably supported in an emergency.

A headrest according to a fourth aspect of the present disclosure is the headrest according to any one of the first aspect to the third aspect, wherein a pair of slide shafts extending toward an upper side extends from respective end portions of the shaft extending along the seat width direction, and the pair of slide shafts is slidably supported by a pair of slide guiding portions disposed at a framework member of the upper pillow section and having an axial direction along the seat vertical direction.

In the headrest according to the fourth aspect of the present disclosure, the pair of slide shafts extending toward an upper side extends from respective end portions of the shaft extending along the seat width direction and configuring a rotation axis of the lower pillow section. The slide shafts is slidably supported by the pair of slide guiding portions disposed at a framework member of the upper pillow section and having an axial directions along the seat vertical direction. The rotation axis and the slide shaft of the lower pillow section are thereby configured by the same member, thereby enabling adjustment of the front-rear position and adjustment of the vertical position of the lower pillow section with respect to the upper pillow section to be realized with a simple configuration.

A headrest according to a fifth aspect of the present disclosure is the headrest according to any one of the first aspect to the fourth aspect, wherein an extension portion is formed at the seat lower side of the upper pillow section so as to extend toward the seat lower side from a rear side of the upper portion of the headrest, and to support the lower pillow section from the seat rear side when the lower pillow section is positioned in a rear position.

In the headrest according to the fifth aspect of the present disclosure, the extension portion is formed at the lower side of the upper pillow section so as to extend toward the lower side from the rear side of the upper portion of the headrest, and to support the lower pillow section from the rear side of the seat when the lower pillow section is positioned at a rear position. Thus, even if a large load is input so as to move the lower pillow section toward the seat rear side in cases in which the vehicle suddenly accelerates or a rear-end collision has occurred, the lower pillow section is supported by the extension portion, thereby restricting the lower pillow section from moving further toward the seat rear side than the rear position.

A headrest according to a sixth aspect of the present disclosure is the headrest according to any one of the first aspect to the fifth aspect, wherein the lower pillow section is joined by a friction hinge to the shaft extending along the seat width direction so as to be steplessly adjustable in a seat front-rear direction about the shaft extending along the seat width direction.

In the headrest according to the sixth aspect of the present disclosure, the lower pillow section is joined by the friction hinge to the shaft extending along the seat width direction so as to be steplessly adjustable in the seat front-rear direction about the shaft extending along the seat width direction. The lower pillow section is swung about the shaft extending along the seat width direction by applying a seat front-rear direction external force of a pre-set value or greater to the lower pillow section. Even if a large load is input so as to move the lower pillow section toward the seat rear side in cases in which the vehicle suddenly accelerates or a rear-end collision has occurred, the lower pillow section is able to move toward the seat rear side alongside the neck of the occupant. This prevents an excessive reaction force from acting on the neck from the lower pillow section during sudden vehicle acceleration or a rear-end collision, enabling both the comfort of the occupant to be improved and occupant neck protection performance in a rear-end collision or the like to be improved.

A vehicle seat according to a seventh aspect of the present disclosure includes a seat cushion and a seatback, and the headrest of any one of the first aspect to the sixth aspect installed at a seat upper side of the seatback.

In the vehicle seat according to the seventh aspect of the present disclosure, the headrest installed at the seat upper side of the seatback is the headrest of any one of the first aspect to the sixth aspect, thereby enabling the operation and effects previously described to be exhibited.

A vehicle seat according to an eighth aspect of the present disclosure is the vehicle seat according to the seventh aspect, wherein a vertical position of the lower pillow section is adjustable with respect to the upper pillow section by sliding the lower pillow section along a seat front face of the seatback, and in a state in which the lower pillow section is positioned in a lower position, the lower pillow section is supported from the seat rear side by a supporting seat face at an upper portion of the front face of the seatback.

In the vehicle seat according to the eighth aspect of the present disclosure, the vertical position of the lower pillow section of the headrest is adjustable with respect to the upper pillow section by sliding the lower pillow section along the seat front face of the seatback. In a state in which the lower pillow section is positioned in the lower position, the lower pillow section is supported from the seat rear side by the supporting seat face at the upper portion of the front face of the seatback. This enables the vertical position of the lower pillow section to be adjusted to a position where the lower pillow section is alongside the neck of the occupant, and enables the lower pillow section to receive reaction force from the supporting seat face at the upper portion of the front face of the seatback. Thus, even if the vertical position of the neck of the seated occupant differs according to the physical build of the occupant, the head the occupant can be stably supported from below by the lower pillow section.

Due to being configured as described above, the vehicle seat according to the present disclosure enables the comfort of an occupant to be improved.

BRIEF DESCRIPTION OF THE DRAWINGS

Exemplary embodiments of the present disclosure will be described in detail based on the following figures, wherein:

FIG. 7 is an exploded perspective view illustrating the headrest illustrated in FIG. 1 in a state viewed from an oblique seat front side;

FIG. 9 is a perspective view illustrating an upper end portion of a seatback and a headrest of a vehicle seat according to a second exemplary embodiment of the present disclosure; and FIG. 10 is an exploded perspective view illustrating the headrest illustrated in FIG. 9 in a state viewed from an oblique seat front side.

DETAILED DESCRIPTION

First Exemplary Embodiment

Figure 1:
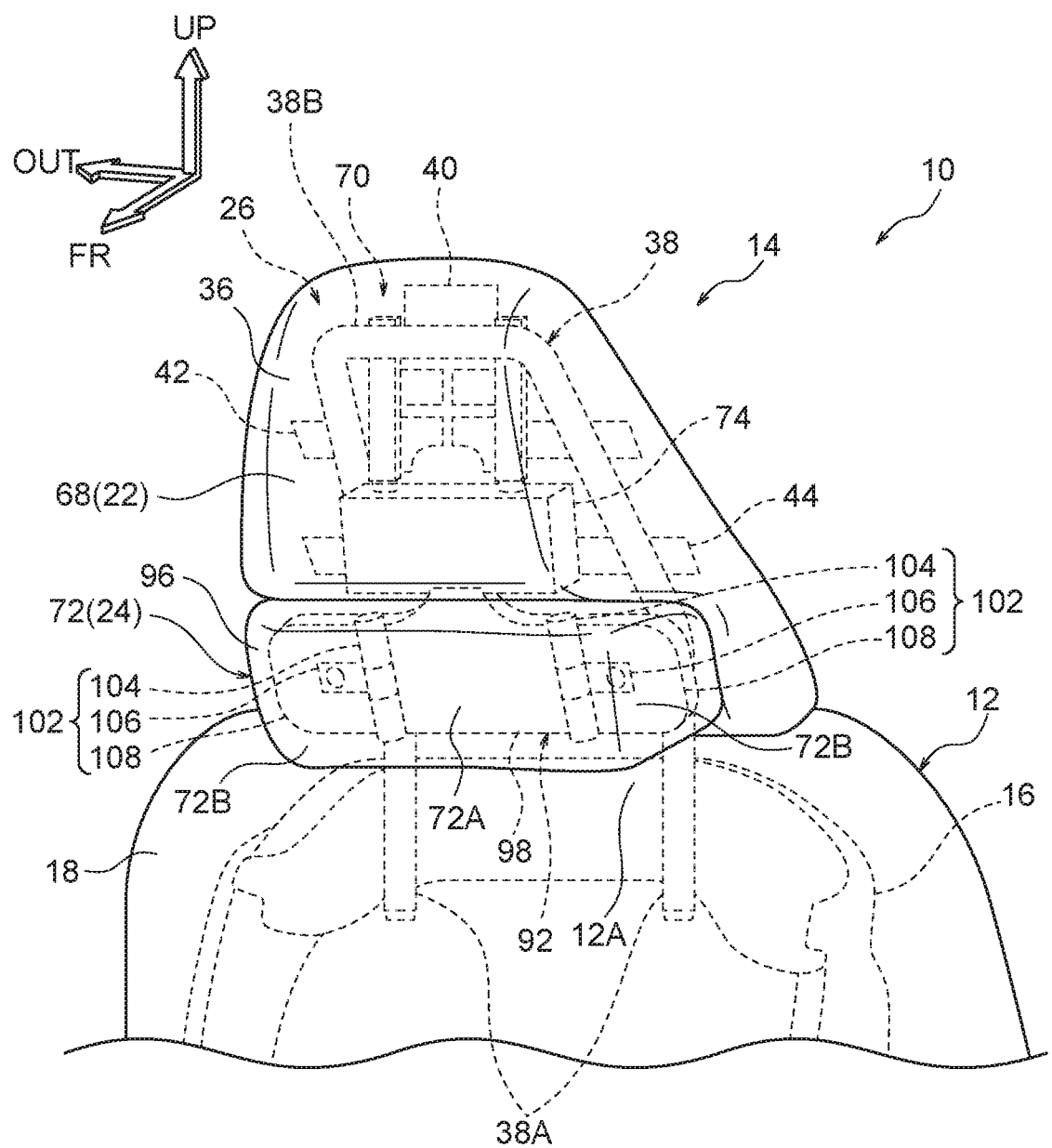
FIG. 1 is a perspective view illustrating an upper end portion of a seatback and a headrest of a vehicle seat according to a first exemplary embodiment of the present disclosure.

Explanation follows regarding a vehicle seat 10 according to an exemplary embodiment of the present disclosure, with reference to FIG. 1 to FIG. 8B. Note that in each of the drawings, the arrow FR indicates a vehicle forward direction, the arrow OUT indicates a vehicle width direction outer side, and the arrow UP indicates a vehicle upward direction, as appropriate. Moreover, some reference numerals may be omitted from the drawings in order to facilitate viewing of the drawings. Note that for ease of explanation, a case section 28 is omitted from illustration in FIG. 1 to FIG. 3. Moreover, a bezel 62 is omitted from illustration in FIG. 4 to FIG. 5.

Overall Configuration

Figure 2:
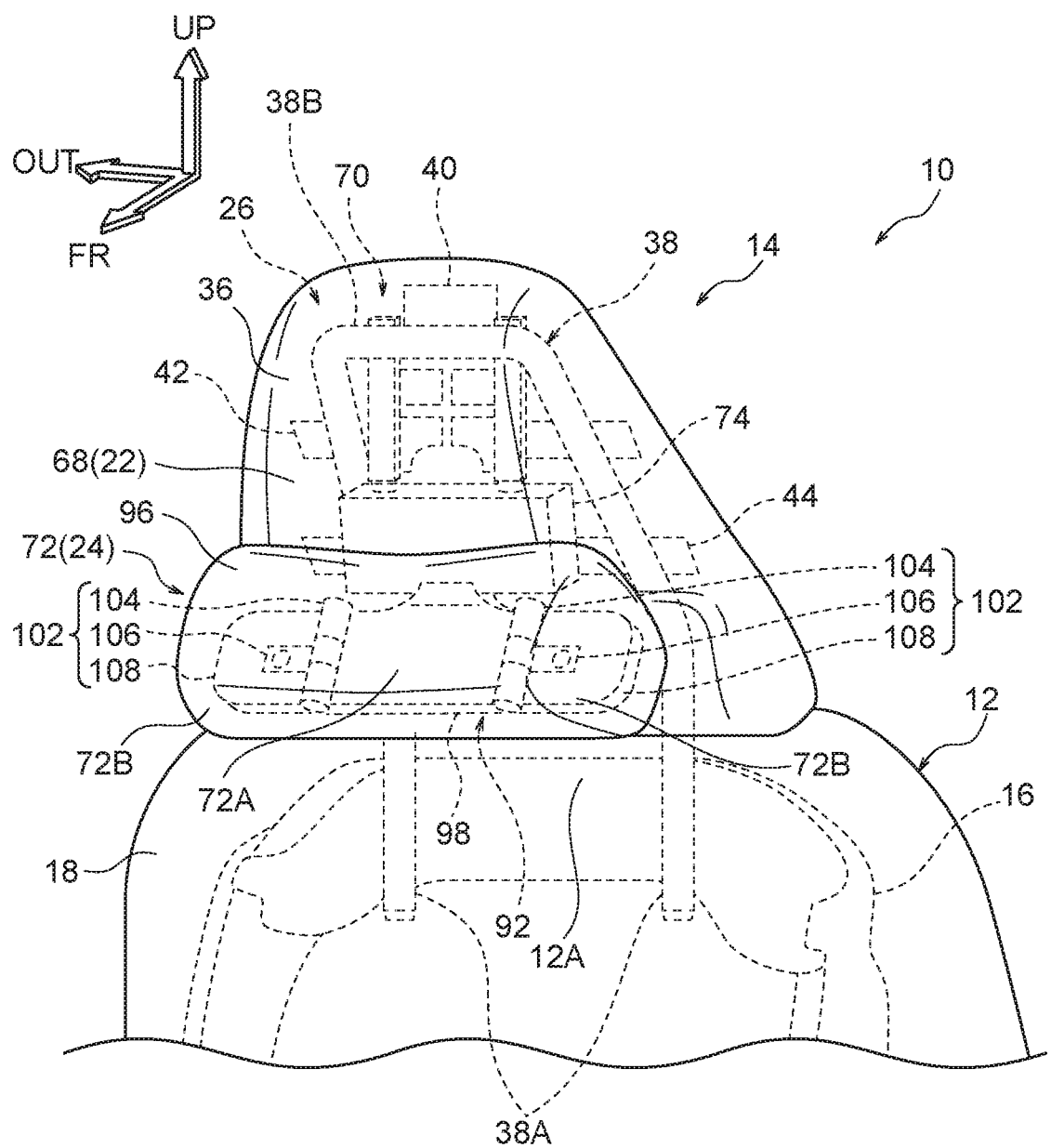
FIG. 2 is a perspective view corresponding to FIG. 1, illustrating a lower pillow section of the headrest in a state positioned in an upper position and a front position.
Figure 3:
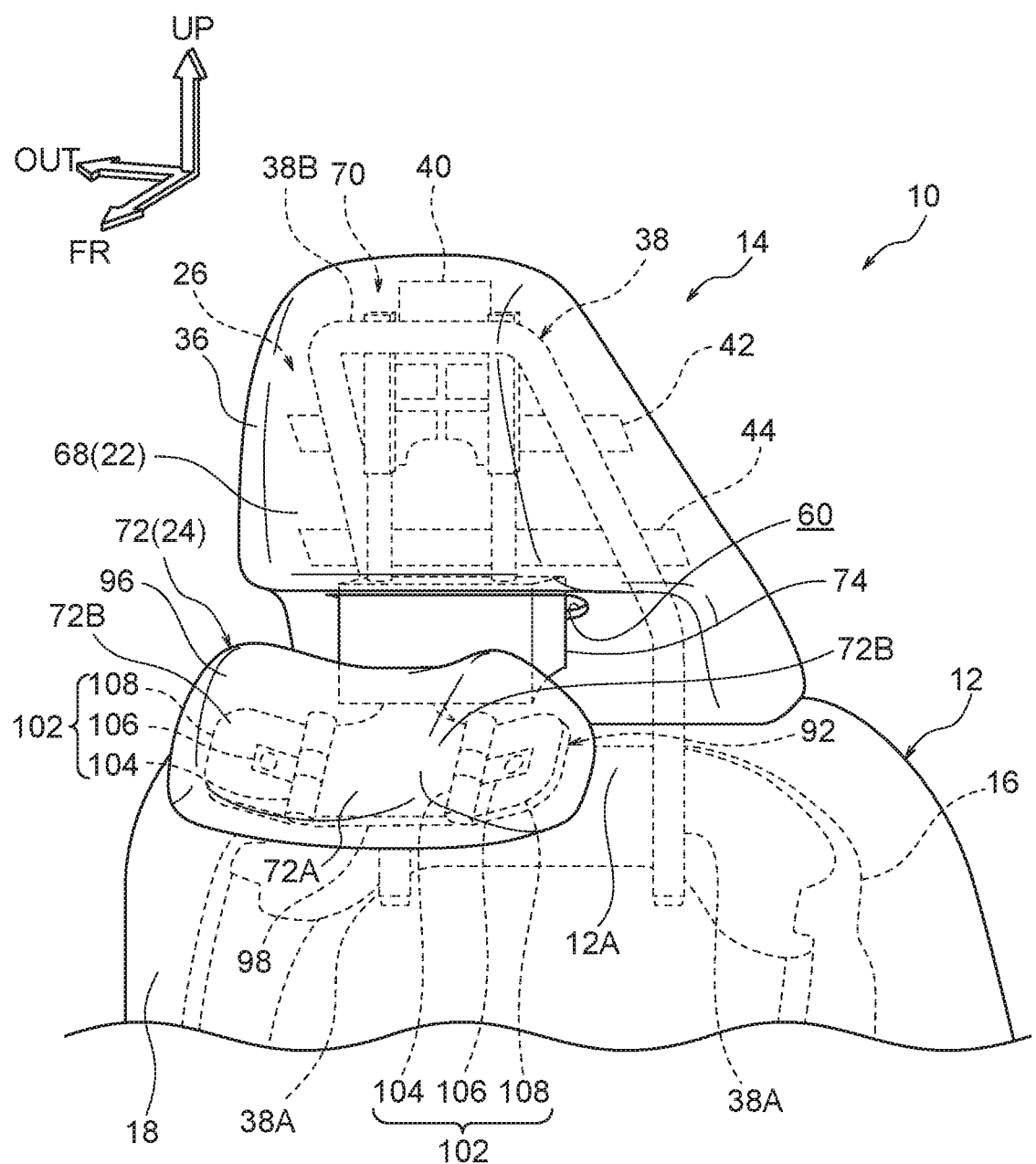
FIG. 3 is a perspective view corresponding to FIG. 1, illustrating a lower pillow section of the headrest in a state positioned in a lower position with two seat width direction side portions of the lower pillow section protruding toward a seat front side with respect to a seat width direction intermediate portion of the lower pillow section.
Figure 4:
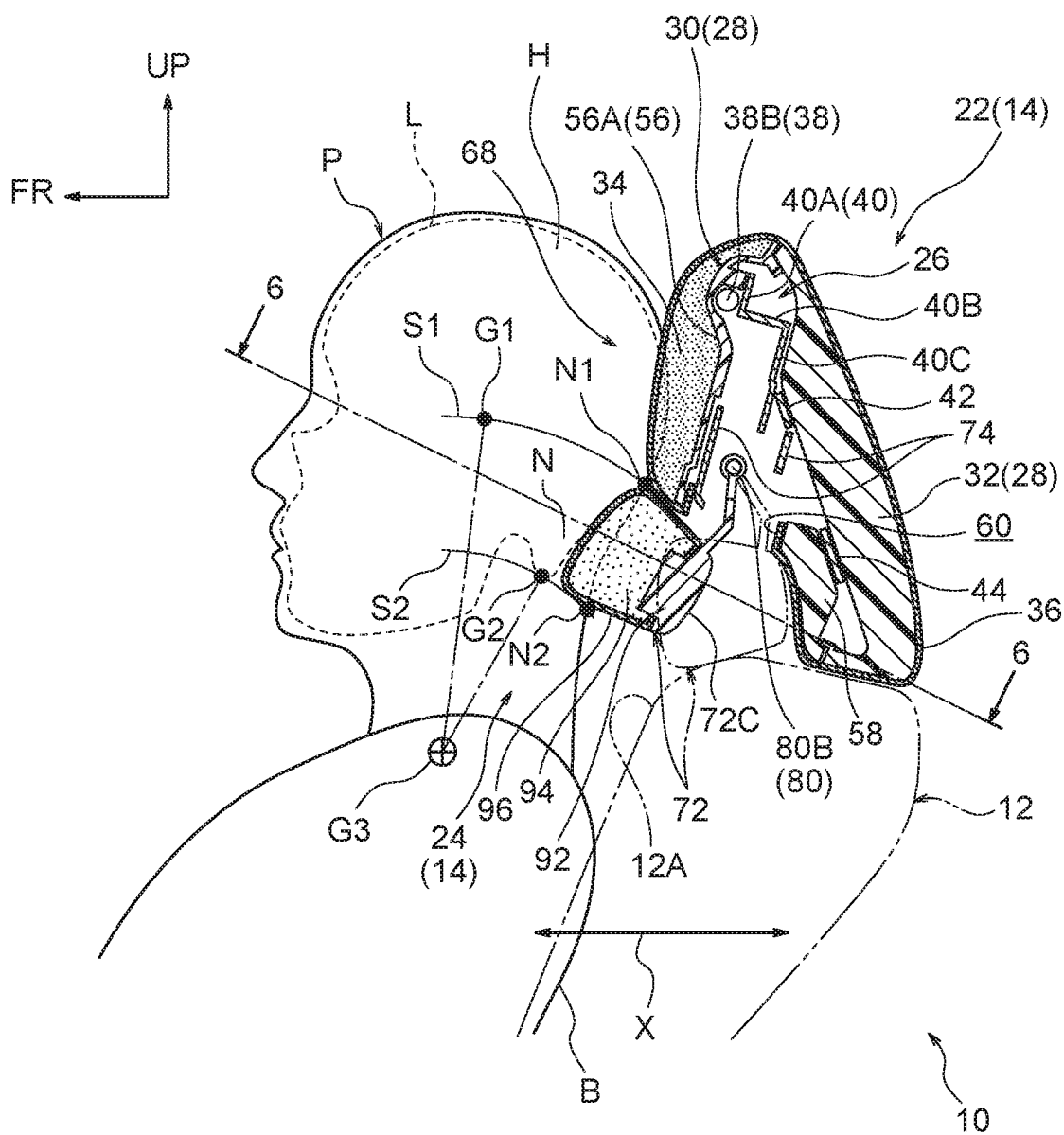
FIG. 4 is a schematic vertical cross-section illustrating an upper end portion of the seatback and the headrest illustrated in FIG. 1 in a state viewed from a seat left side in order to explain adjustment of a front-rear position of a lower pillow section with respect to an upper pillow section.
Figure 5:
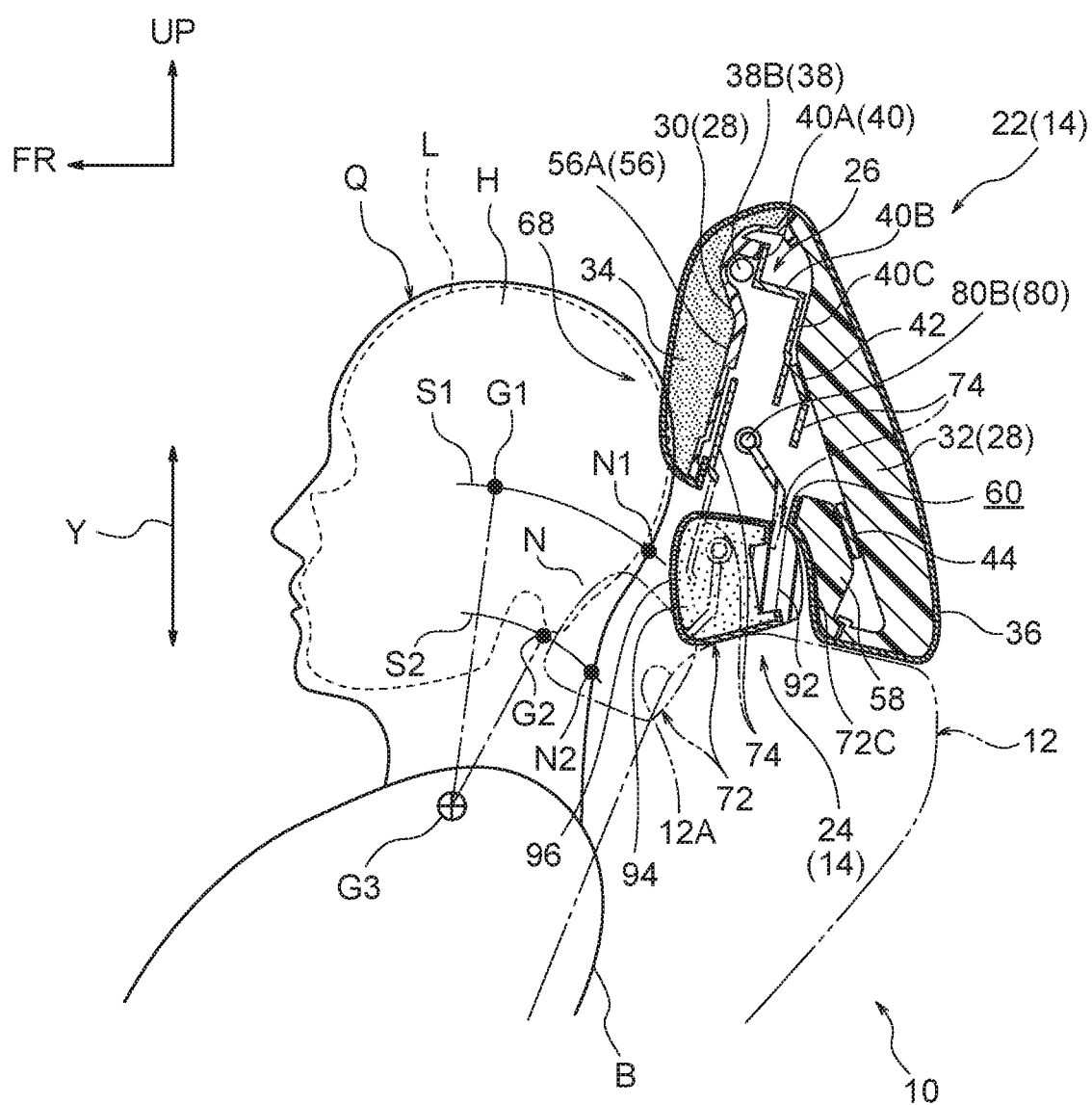
FIG. 5 is a schematic vertical cross-section to explain adjustment of a vertical position of a lower pillow section with respect to an upper pillow section of a headrest.
Figure 6:
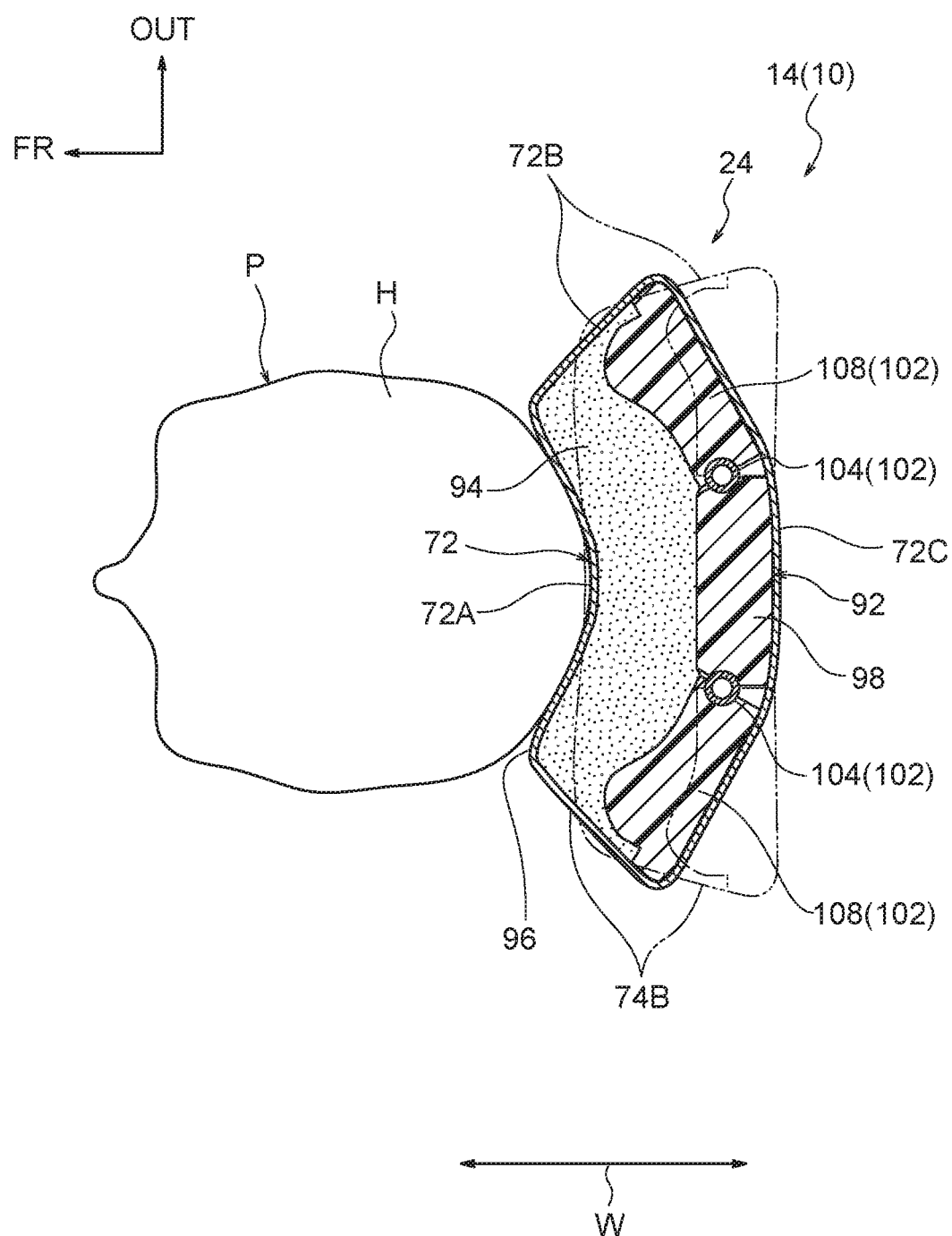
FIG. 6 is a schematic cross-section illustrating a state sectioned along line 6-6 in FIG. 4, in order to explain a relationship between a seat width direction intermediate portion of a lower pillow section and shafts extending in a seat vertical direction.
Figure 8A:
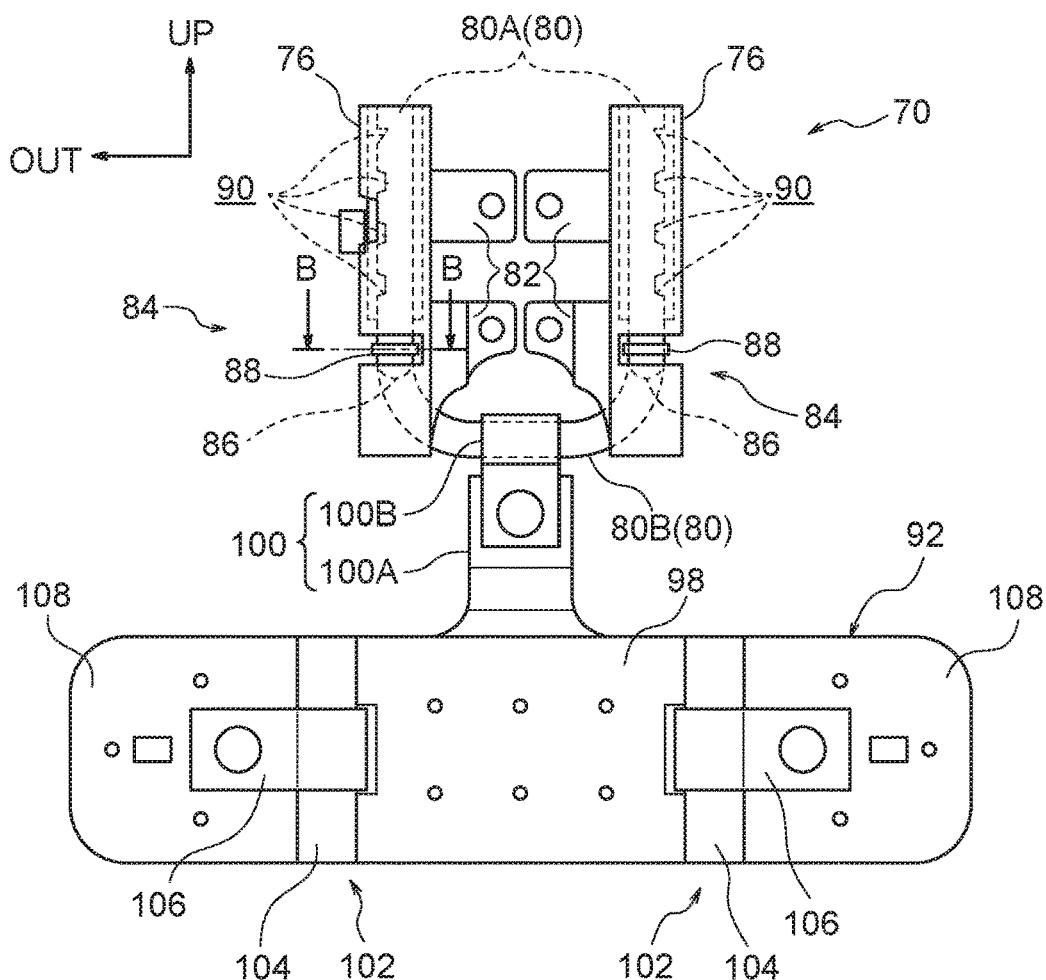
FIG. 8A is an enlarged face-on view of illustrating relevant portions of a vertical adjustment mechanism, a front-rear adjustment mechanism, and a side adjustment mechanism of the headrest illustrated in FIG. 1.
Figure 8B:
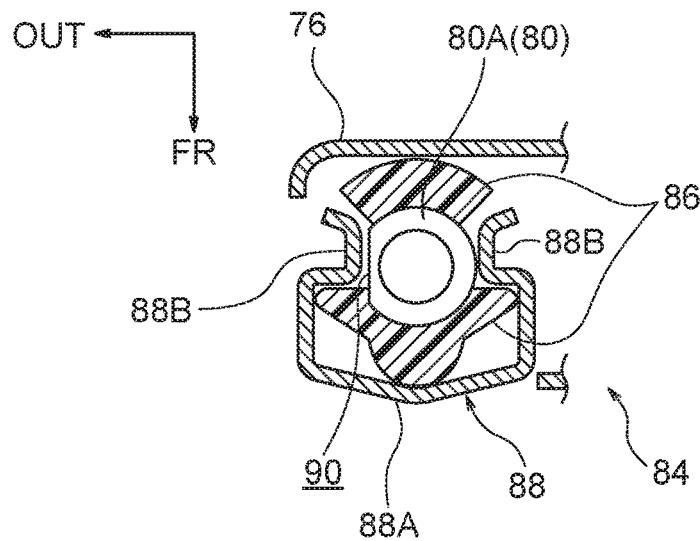
FIG. 8B is an enlarged, partial cross-section, illustrating a state sectioned along line B-B in FIG. 8A.

As illustrated in FIG. 1 to FIG. 6, the vehicle seat 10 according to the present exemplary embodiment includes a seatback 12 and a headrest 14 installed at the upper side of the seatback 12. The seatback 12 is tiltably coupled to a rear end portion of a non-illustrated seat cushion that supports the buttocks and thighs of an occupant P or an occupant Q, and the seatback 12 supports the back B of the occupant P or the occupant Q seated on the seat cushion. Front-rear, left-right, and vertical directions of the vehicle seat 10 are aligned with front-rear, left-right, and vertical directions of a vehicle. The occupant P illustrated in FIG. 4 and FIG. 6 is for example a human dummy of an AM50 (an American adult male in the 50$^{th}$ percentile), and the occupant Q illustrated in FIG. 5 is a human dummy of a JF50 (a Japanese adult female in the 50$^{th}$ percentile).

The seatback 12 is configured by covering and attaching a seatback pad (not illustrated in the drawings) configuring a cushion member to a seatback frame 16 configuring a framework member, and covering the surface of the seatback pad with a trim cover 18 configuring a covering member. A left and right pair of headrest supports (not illustrated in the drawings) for coupling the headrest 14 to the seatback frame 16 are attached to an upper end portion of the seatback frame 16.

The headrest 14 is coupled to the upper end portion of the seatback frame 16 using the pair of headrest supports. The headrest 14 is configured by a headrest body 22 that supports the head H of the occupant P or the occupant Q, and a neck rest section 24 that is supported by the headrest body 22 and that supports at least part of a nape support region N of the occupant. Front-rear, left-right, and vertical directions of the headrest 14 are substantially aligned with front-rear, left-right, and vertical directions of the seatback 12, and are substantially aligned with the front-rear, left-right, and vertical directions of the vehicle when the seatback 12 is in an upright state as illustrated in FIG. 1 to FIG. 6. In the description below, simple reference to the front-rear, left-right, and vertical directions refers to the directions of the headrest 14.

To explain further, as illustrated in FIG. 4 and FIG. 5, the nape support region N is a region configuring an upper portion of the nape of the neck (at the lower side of the rear of the head) of the occupant P or the occupant Q. Specifically, the nape support region N is a region of the nape of the neck of the occupant P or the occupant Q, located between a contact point N1 between the nape of the neck and a curved line S1 extending from a center of gravity G1 of the head H of the occupant P or the occupant Q in side view, and a contact point N2 between the nape of the neck and a curved line S2 extending from a lower end G2 of the skull of the occupant P or the occupant Q in side view. Note that the curved line S1 corresponds to a rotation trajectory of the center of gravity G1 of the head H of the occupant P or the occupant Q when rotated about a rotation center G3 of the neck in side view. The curved line S2 corresponds to a rotation trajectory of the lower end G2 of the skull of the occupant P or occupant Q when rotated about the rotation center G3 of the neck in side view. In FIG. 4 and FIG. 5, an outline of the skull of the occupant P or the occupant Q is schematically illustrated by an intermittent line L.

Headrest Body 22

As illustrated in FIG. 7, the headrest body 22 is configured by a stay assembly 26 configuring a frame (framework member), the case section 28 that houses an upper portion of the stay assembly 26, a pad member 34 configuring a cushion member, and a trim cover 36 (see FIG. 1 to FIG. 5; not illustrated in FIG. 7) configuring a covering member.

The stay assembly 26 is configured by a headrest stay 38, an upper bracket 40, a middle bracket 42, and a lower bracket 44. The headrest stay 38 is for example formed by bending a metal pipe substantially into a U shape, and is configured by a left and right pair of downward-extending legs 38A, and an upper portion 38B that couples upper end portions of the legs 38A together in the seat width direction. A seat vertical direction intermediate portion of each of the pair of legs 38A is bent such that a location above the intermediate portion is inclined toward the seat front side in side view. The pair of legs 38A are coupled to the upper end portion of the seatback frame 16 through the left and right pair of headrest supports (not illustrated in the drawings). Any one of plural notches 39 formed in one of the legs 38A engages with a non-illustrated engagement portion of the corresponding headrest support to lock vertical movement of the headrest stay 38 with respect to the seatback frame 16. The vertical position of the headrest body 22 with respect to the seatback 12 is thereby adjustable in plural increments.

As illustrated in FIG. 4, the upper bracket 40 is formed by press forming sheet metal, for example. As viewed from the side, the upper bracket 40 includes a front wall 40A extending along the seat vertical direction, an intermediate wall 40B extending toward the seat rear from a lower end portion of the front wall 40A, and a rear wall 40C extending toward the seat lower side from a rear end portion of the intermediate wall 40B, such that the upper bracket 40 has a substantially crank shaped profile in side view. A front face of a lower portion of the front wall 40A is fixed to the upper portion 38B of the headrest stay 38 by a method such as welding. An upper portion of the front wall 40A projects toward the seat upper side of the upper portion 38B in face-on view, and a left and right pair of through-holes 46 are formed in the upper portion of the front wall 40A (see FIG. 7).

The middle bracket 42 and the lower bracket 44 are each formed as an elongated plate body by press forming sheet metal, for example, and are disposed with their length directions in the seat width direction. The middle bracket 42 spans between the left and right pair of legs 38A close to an upper end portion of the headrest stay 38, and is fixed to the headrest stay 38 by a method such as welding. The two length direction end portions of the middle bracket 42 project toward the seat width direction outer sides of the pair of legs 38A in face-on view, and a through-hole 48 is formed in each of the two end portions.

The lower bracket 44 is disposed at the lower side of the middle bracket 42. Similarly to the middle bracket 42, the lower bracket 44 also spans between the left and right pair of legs 38A of the headrest stay 38 and is fixed to the headrest stay 38 by a method such as welding. Moreover, a through-hole 50 is formed in each of the two length direction end portions of the lower bracket 44.

The upper portion of the stay assembly 26 configured as described above is covered by the case section 28. The case section 28 is configured by a front case 30 and a rear case 32 that are formed by resin injection molding, for example, such that the case section 28 is split in the seat front-rear direction, and the front case 30 and the rear case 32 are joined together at peripheral edges.

The front case 30 includes a first support portion 56 formed at an upper portion of the case, and a second support portion 58 integrally formed at the lower side of the first support portion 56. The first support portion 56 is formed in a box shape open toward the seat rear, and has a substantially trapezoidal shaped profile in face-on view. A cross-section profile of the first support portion 56 sectioned along the seat vertical direction has a substantially L shape open toward the seat upper side and rear side, and the first support portion 56 is configured by a front face 56A extending substantially along the seat vertical direction and a lower face 56B extending from a lower end portion of the front face 56A toward the seat rear. An opening 60 is formed so as to penetrate the lower face 56B in the seat vertical direction. The bezel 62, configuring a frame body, is clipped onto a peripheral edge of the opening 60 with claws or the like. As illustrated in FIG. 4, the upper bracket 40 installed at an upper end portion of the stay assembly 26 is disposed within the first support portion 56. In this state, the upper bracket 40 and the opening 60 formed in the lower face 56B are disposed opposing each other in the seat vertical direction.

The second support portion 58 extends toward the seat lower side and slightly toward the seat rear side, and is integrally formed to the first support portion 56 at a rear end portion of the lower face 56B. The second support portion 58 is formed in a rectangular shape with its length direction along the seat width direction in face-on view, and has a shallow bottomed saucer-shaped profile open toward the seat rear side.

A flange 64 is formed along a peripheral edge of the front case 30 configured as described above, with the exception of at a lower end portion of the front case 30. Plural attachment holes (not appended with reference numerals) are formed in the flange 64. The attachment holes correspond to the through-holes 46, 48, 50 respectively formed in the upper bracket 40, the middle bracket 42, and the lower bracket 44 of the stay assembly 26. Lattice shaped ribs (not appended with reference numerals) are integrally formed to an inner face of the front case 30.

The rear case 32 is configured as a plate body with a substantially trapezoidal shaped profile in face-on view. Similarly to the front case 30, lattice shaped ribs (not appended with reference numerals) are integrally formed to an inner face of the rear case 32. A flange 66 is formed along a peripheral edge of the rear case 32 with the exception of at a lower end portion thereof, and plural attachment holes (not appended with reference numerals) are formed in the flange 66. The attachment holes correspond to the through-holes 46, 48, 50 respectively formed in the upper bracket 40, the middle bracket 42, and the lower bracket 44 of the stay assembly 26. The front case 30 and the rear case 32 are fastened together by non-illustrated fasteners, with the upper bracket 40, the middle bracket 42, and the lower bracket 44 interposed therebetween. The case section 28 is thereby supported by the stay assembly 26.

Part of the front case 30 of the case section 28 with the above configuration is covered by the pad member 34 configuring the cushion member. Specifically, as illustrated in FIG. 4, FIG. 5, and FIG. 7, the pad member 34 is attached to an outer peripheral edge of the front case 30, with the exception of at a lower end portion thereof, and to the seat front side of the first support portion 56 of the front case. The pad member 34 is configured by a foamed body such as urethane foam.

The surfaces of the case section 28 and the pad member 34 are covered by the trim cover 36 configuring a covering member. For example, the trim cover 36 is formed by stitching together plural covering pieces made of fabric, leather, artificial leather, or the like, into a bag shape.

In the headrest body 22 with the above configuration, the head H of the occupant P is supported from the seat rear side by the first support portion 56 configuring an upper portion of the headrest 14, and by the pad member 34 disposed at the seat front side of the first support portion 56. The front side of the upper portion of the headrest 14 with the above configuration (a location supported by the first support portion 56) configures an upper pillow section 68. The second support portion 58 formed at the lower side of the first support portion 56 corresponds to an extension portion of the present disclosure.

Neck Rest Section 24

As illustrated in FIG. 4, FIG. 7, FIG. 8A, and FIG. 8B, the neck rest section 24 is principally configured by a vertical adjustment mechanism 70, a lower pillow section 72, and a support panel 74.

The vertical adjustment mechanism 70 is configured by a pair of slide guiding portions 76 supported by the stay assembly 26 of the headrest body 22, and a neck rest stay 80 supported so as to be capable of sliding against the pair of slide guiding portions 76. The pair of slide guiding portions 76 are each formed with an elongated, substantially angular tube shaped profile using a metal material, and are disposed with their length directions along the seat vertical direction on both the left and right sides of the upper bracket 40 welded to the headrest stay 38. The pair of slide guiding portions 76 are configured with left-right symmetry to each other. Each of the slide guiding portions 76 is provided with an upper and lower pair of attachment brackets 82 at a seat width direction inner edge thereof. Attachment holes (not appended with reference numerals) corresponding to the upper bracket 40 are formed in the pairs of attachment brackets 82. The pair of slide guiding portions 76 are fastened and fixed to the upper bracket 40 by fasteners (not illustrated in the drawings) such as nuts and bolts inserted through the respective attachment holes. The slide guiding portions 76 are thereby supported by the stay assembly 26 that configures a frame (framework member) of the headrest 14.

Anchor portions 84 (see FIG. 8A, FIG. 8B) that anchor the neck rest stay 80, described later, are provided at an inner side of the slide guiding portions 76. Each of the anchor portions 84 is configured by a support member 86 supported by the corresponding slide guiding portion 76, and a plate spring 88 anchored to a lower end portion of the support member 86. As an example, each support member 86 is formed with an elongated circular tube shaped profile, and is disposed inside the corresponding slide guiding portion 76 so as to be coaxial thereto. Each of the plate springs 88 includes a base end portion 88A anchored to a front face of the corresponding support member 86, and a pair of clamp portions 88B that respectively extend from the two seat width direction end portions of the base end portion 88A toward the seat rear side, and are each formed with a substantially U-shaped profile in plan view (see FIG. 8B). A spacing between the respective clamp portions 88B is set smaller than an outer diameter of legs 80A of the neck rest stay 80. Thus, when the corresponding leg 80A of the neck rest stay 80 is inserted between the pair of clamp portions 88B, the clamp portions 88B undergo elastic deformation in directions away from each other. The pair of clamp portions 88B are thereby urged in a direction toward each other.

As an example, the neck rest stay 80 is formed by bending a metal pipe into an inverted, substantially U shape, and is configured by the left and right pair of upwardly-extending legs 80A, and a lower portion 80B coupling lower end portions of the legs 80A together in the seat width direction. Plural, groove shaped notches 90 are formed at predetermined spacings along the seat vertical direction in seat width direction outer portions of the pair of legs 80A. Note that the pair of legs 80A correspond to a slide shaft of the present disclosure.

The pair of legs 80A of the neck rest stay 80 are passed through the opening 60 of the above-described front case 30 and inserted into the tube shaped slide guiding portions 76 from the seat lower side. The legs 80A slide against the inside of the support members 86 of the anchor portions 84 as the legs 80A slide against the slide guiding portions 76 in the length direction. When the notches 90 of the legs 80A attempt to pass the plate springs 88, the pairs of clamp portions 88B undergo elastic recovery and engage with the corresponding notches 90. The sliding of the legs 80A against the slide guiding portions 76 is thus locked.

When a seat vertical direction external force of a pre-set value or greater is applied to the legs 80A, the pairs of clamp portions 88B again undergo elastic deformation in directions away from each other, allowing the plate springs 88 to ride over the notches 90. Thus, the legs 80A are again able to slide against the slide guiding portions 76 in the seat vertical direction. Namely, the vertical position of the neck rest stay 80 with respect to the slide guiding portions 76 is adjustable in increments by changing the engagement position of the plate springs 88 with the notches 90 as desired.

The lower pillow section 72 is principally configured by a neck rest assembly 92 configuring a frame (framework member), a pad member 94 configuring a cushion member, and a trim cover 96 (see FIG. 1 to FIG. 6; not illustrated in FIG. 7) configuring a covering member. The neck rest assembly 92 is configured by a main frame 98, a front-rear adjustment mechanism 100 provided at an upper end portion of the main frame 98, and a left and right pair of side adjustment mechanisms 102 (see FIG. 6, FIG. 8A).

The main frame 98 is formed by resin injection molding, for example, and is configured as a substantially rectangular plate in face-on view. The upper end portion of the main frame 98 is connected to a lower end portion of a bracket 100A configuring the front-rear adjustment mechanism 100. The bracket 100A is configured as an elongated plate, and has a substantially L-shaped profile open toward the seat upper side and front side in side view. An upper end portion of the bracket 100A and the lower portion 80B of the neck rest stay 80 described above are coupled together through a friction hinge 100B configuring the front-rear adjustment mechanism 100.

The friction hinge 100B has a function to swing the main frame 98 about the lower portion 80B configuring the neck rest stay 80 such that the lower portion 80B serves as the rotation axis, and is configured by a known friction hinge mechanism. The friction hinge 100B is thereby configured so as to be retained at a predetermined swing angle with respect to the lower portion 80B. When a seat front-rear direction external force of a pre-set value or greater is applied to the friction hinge 100B, the friction hinge 100B is capable of rotating in the seat front-rear direction about the lower portion 80B against the frictional force arising between the friction hinge 100B and a peripheral face of the lower portion 80B. Note that the periphery of the bracket 100A and the friction hinge 100B configuring the front-rear adjustment mechanism 100 is covered by a resin or fabric cover member (not appended with a reference numeral).

A left and right pair of shafts 104, a left and right pair of hinges 106, and a left and right pair of side frames 108, these being configuration members of the left and right pair of side adjustment mechanisms 102, are respectively installed on the left and right sides of the main frame 98. Note that the left and right pair of side adjustment mechanisms 102 are configured with left-right symmetry, but otherwise have the same configuration as each other.

The left and right pair of shafts 104 are each formed with an elongated circular column shaped profile, and are installed with their axial directions in the vertical direction of the main frame 98. The pair of shafts 104 are respectively fixed to the two seat width direction side portions of the main frame 98.

The pair of side frames 108 are formed by resin injection molding, for example, and are configured as substantially rectangular shaped plates in face-on view. The side frames 108 are coupled to the corresponding shafts 104 through the hinges 106. The hinges 106 have a function to swing the side frames 108 about the shafts 104 such that the shafts 104 serve as the rotation axes, and are configured by known friction hinge mechanisms similarly to the friction hinge 100B previously described. The side frames 108 are thereby capable of rotating relative to the corresponding shafts 104 when applied with a load of a predetermined value or greater. The side frames 108 are each configured so as to be retained at a predetermined swing angle with respect to the corresponding shaft 104 by frictional force arising at a peripheral face of the shaft 104.

As illustrated in FIG. 6 and FIG. 7, the pad member 94 is attached to the neck rest assembly 92. The pad member 94 is formed of a foamed body such as urethane foam. The pad member 94 is covered by the trim cover 96. For example, the trim cover 96 is formed by stitching together plural covering pieces made of fabric, leather, artificial leather, or the like, into a bag shape.

The lower pillow section 72 configured as described above has a seat width direction dimension set larger than a seat vertical direction dimension, and a seat front-rear direction dimension set significantly smaller than the seat vertical direction dimension and the width direction dimension. The nape support region N of the occupant P can be supported from the rear as required by using the vertical adjustment mechanism 70, the front-rear adjustment mechanism 100, and the side adjustment mechanisms 102 described above. Specific explanation follows below.

As illustrated in FIG. 3 and FIG. 5, the vertical position of the lower pillow section 72 is capable of being adjusted with respect to the upper pillow section 68 by the vertical adjustment mechanism 70 (see the arrow Y in FIG. 5). Specifically, the lower pillow section 72 is adjustable in increments between an uppermost position serving as an upper position, illustrated by solid lines in FIG. 5, and a lowermost position serving as a lower position, illustrated by double-dotted dashed lines in FIG. 5.

As illustrated in FIG. 1, FIG. 2, and FIG. 4, a front-rear position of the lower pillow section 72 is capable of being adjusted with respect to the upper pillow section 68 by the front-rear adjustment mechanism 100 (see the arrow X in FIG. 4). Specifically, in a state in which the lower pillow section 72 is positioned in the uppermost position, the lower pillow section 72 is disposed at the seat lower side of the upper pillow section 68 and at the upper side of the seatback 12, and the front-rear position of the lower pillow section 72 is steplessly adjustable with respect to the upper pillow section 68 between a foremost position illustrated by solid lines in FIG. 4, and a rearmost position illustrated by double-dotted dashed lines in FIG. 4.

In a state in which the lower pillow section 72 is positioned in the uppermost position and the rearmost position, the lower pillow section 72 is disposed at the lower side of the upper pillow section 68, and the upper pillow section 68 and the lower pillow section 72 outwardly appear to be an integral unit (see the double-dotted dashed lines in FIG. 4). A rear face 72C of the lower pillow section 72 abuts the second support portion 58 integrally formed to the front case 30, such that the lower pillow section 72 is restricted from moving toward the seat rear side by the second support portion 58.

When the lower pillow section 72 is moved toward the lowermost position, the lower pillow section 72 set in the uppermost position is initially swung toward the seat front side by the front-rear adjustment mechanism 100. The lower pillow section 72 is then slid toward the seat lower side along a front face upper portion 12A of the seatback 12. Thus, in a state in which the lower pillow section 72 has been moved further toward the seat lower side than the uppermost position, the lower pillow section 72 is supported from the rear by the front face upper portion 12A of the seatback 12 (see FIG. 5).

Note that as illustrated in FIG. 4, in cases in which the occupant P (a human dummy of an AM 50) is seated in the vehicle seat 10 in a standard posture, the lower pillow section 72 is in a state positioned in the uppermost position. When the lower pillow section 72 is moved further toward the seat front side than the rearmost position in this state, adjustment can be made such that at least part of the lower pillow section 72 is positioned in a position alongside the nape support region N of the occupant P in side view. The head H of the occupant P is thereby supported from below by the lower pillow section 72.

As illustrated in FIG. 5, in cases in which the occupant Q (a human dummy of a JF50) with a smaller physical build than the occupant P is seated in the vehicle seat 10 in a standard posture, the lower pillow section 72 is in a state positioned in the lowermost position. In this state, at least part of the lower pillow section 72 is disposed alongside the nape support region N of the occupant Q in side view, and the head H of the occupant Q is supported from below by the lower pillow section 72.

Furthermore, two seat width direction side portions 72B of the lower pillow section 72 are capable of being swung about the left and right pair of shafts 104 with respect to a left-right direction intermediate portion 72A by the left and right pair of side adjustment mechanisms 102 (see the arrow W in FIG. 6). A protrusion amount by which the two side portions 72B protrude toward the front with respect to the intermediate portion 72A is thereby adjustable. Specifically, the positions of the two side portions 72B are steplessly adjustable between a protruding position illustrated by solid lines in FIG. 6, and a normal position illustrated by double-dotted dashed lines in FIG. 6. The two side portions 72B of the lower pillow section 72 are thereby capable of being disposed alongside the sides of the nape support region N of the occupant P or the occupant Q (capable of supporting the sides in a face-to-face contact state).

Note that as illustrated in FIG. 7, the periphery of a location where the vertical adjustment mechanism 70 and the lower pillow section 72 are coupled together is covered by the support panel 74. The support panel 74 is formed in a flattened tube shape by resin injection molding, for example, and is set such that a seat front-rear direction dimension of the support panel 74 is significantly smaller than a seat vertical direction dimension and a width direction dimension of the support panel 74. A front face of the support panel 74 is fixed to the lower end portions of the pair of legs 80A configuring the neck rest stay 80 using non-illustrated clips or the like. The support panel 74 is thereby supported by the vertical adjustment mechanism 70, and is capable of moving in the seat vertical direction together with the lower pillow section 72 when the lower pillow section 72 is moved by sliding.

As illustrated in FIG. 1, FIG. 2, and FIG. 4, in a state in which the lower pillow section 72 of the headrest 14 is in the uppermost position, the support panel 74 is disposed within the front case 30 configuring the upper pillow section 68. As illustrated in FIG. 3 and FIG. 5, in a state in which the lower pillow section 72 has been slid further toward the seat lower side than the uppermost position, at least part of the support panel 74 is exposed to the exterior through the opening 60 provided in a lower face of the upper pillow section 68, and is disposed in a space between the upper pillow section 68 and the lower pillow section 72.

The support panel 74 configured as described above configures a styling face when employed in a normal state in which the lower pillow section 72 has been slid to the seat lower side, and also functions as a handle when slide-operating the lower pillow section 72. In cases in which the vehicle suddenly accelerates or a rear-end collision or the like occurs in a state in which the lower pillow section 72 has been slid to the seat lower side, the support panel 74 also functions as member that supports the head H of the occupant P attempting to move toward the seat rear side due to inertial force.

Operation and Effects Explanation follows regarding operation and effects of the present exemplary embodiment.

In the vehicle seat 10 according to the present exemplary embodiment, the headrest 14 is installed at the seat upper side of the seatback 12. The headrest 14 includes the upper pillow section 68 that configures the front side of the upper portion of the headrest 14 and supports the head of the occupant P or the occupant Q from the seat rear side, and the lower pillow section 72 that configures the front side of the lower portion of the headrest 14 and is disposed at the seat lower side of the upper pillow section 68. The lower pillow section 72 is attached so as to be capable of swinging about the lower portion 80B disposed extending along the seat width direction at an upper edge side of the lower pillow section 72, such that the front-rear position of the lower pillow section 72 is adjustable with respect to the upper pillow section 68. This enables the front-rear position of the lower pillow section 72 to be adjusted such that at least part of the lower pillow section 72 is in a position alongside the nape support region N of the occupant P. This enables the lower pillow section 72 to be moved to a position where the head H of the occupant P is supported from below by the lower pillow section 72.

Furthermore, the two seat width direction side portions 72B of the lower pillow section 72 swing with respect to the seat width direction intermediate portion 72A about the shafts 104 extending in the seat vertical direction, such that the protrusion amount by which the two side portions 72B protrude seat front side with respect to the intermediate portion 72A is adjustable. This enables the protrusion amount by which the two side portions 72B of the lower pillow section 72 protrude toward the seat front side to be adjusted such that the two side portions 72B are alongside the sides of the nape support region N of the occupant P. The head H of the occupant P can therefore be supported from below over a wide range. This enables the burden on the nape of the neck from the weight of the head H to be alleviated, therefore enabling the comfort of the occupant P to be improved.

In the headrest 14 according to the present exemplary embodiment, the lower pillow section 72 is configured so as to slide along a seat front face of the seatback 12 in side view, and the vertical position of the lower pillow section 72 is adjustable with respect to the upper pillow section 68. This enables the vertical position of the lower pillow section 72 to be adjusted to a position where at least part of the lower pillow section 72 is alongside the nape support region N of the occupant P or the occupant Q. Thus, whether the occupant P or the occupant Q, each with a different physical build to the other, is seated in the vehicle seat 10, the lower pillow section 72 can be precisely moved to a position where the head H of the occupant P or the occupant Q is supported from below by the lower pillow section 72.

In the headrest 14 according to the present exemplary embodiment, the plate shaped support panel 74 is attached to the upper side of the lower pillow section 72. In a state in which the lower pillow section 72 is positioned in the uppermost position, the support panel 74 is housed within the upper pillow section 68, and in a state in which the lower pillow section 72 is positioned further toward the seat lower side than the uppermost position, at least part of the support panel 74 is disposed between the upper pillow section 68 and the lower pillow section 72. This enables the support panel 74 to function as a handle when slide-operating the lower pillow section 72, enabling adjustment of the vertical position of the lower pillow section 72 to be easily performed. Moreover, in cases in which the vehicle suddenly accelerates or a rear-end collision or the like occurs in a state in which the lower pillow section 72 is positioned further to the seat lower side than the uppermost position, the support panel 74 also functions as member that supports the head H of the occupant P or the occupant Q attempting to move toward the seat rear side due to inertial force. This enables a wide range from the head H to the neck of the occupant P or the occupant Q to be stably supported in an emergency.

In the headrest 14 according to the present exemplary embodiment, the lower portion 80B of the neck rest stay 80 extending along the seat width direction configures the rotation axis of the lower pillow section 72. The pair of legs 80A extend toward the seat upper side from the two end portions of the lower portion 80B. The pair of legs 80A are slidably supported by the pair of slide guiding portions 76 disposed with their axial directions along the seat vertical direction and configuring a framework member of the upper pillow section 68. The rotation axis and the slide shaft of the lower pillow section 72 are thereby configured by the same member, thereby enabling adjustment of the front-rear position and adjustment of the vertical position of the lower pillow section with respect to the upper pillow section to be realized with a simple configuration.

In the headrest 14 according to the present exemplary embodiment, the second support portion 58 that extends toward the seat lower side from the rear side of the upper portion of the headrest 14 is formed at the lower side of the upper pillow section 68, such that the lower pillow section 72 is supported from the seat rear side when positioned in the rearmost position. Thus, even if a large load is input so as to move the lower pillow section 72 toward the seat rear side in cases in which the vehicle suddenly accelerates or a rear-end collision has occurred, the lower pillow section 72 is supported by the second support portion 58, enabling the lower pillow section 72 to be restricted from moving further toward the rear than the rearmost position.

In the headrest 14 according to the present exemplary embodiment, the lower pillow section 72 is hinge-joined by the friction hinge 100B to the lower portion 80B of the neck rest stay 80 extending along the seat width direction. The lower pillow section 72 is thereby steplessly adjustable in the seat front-rear direction with respect to the lower portion 80B. The lower pillow section 72 is swung about the lower portion 80B by applying a seat front-rear direction external force of a pre-set value or greater to the lower pillow section 72. Even if a large load is input so as to move the lower pillow section 72 toward the seat rear side in cases in which the vehicle suddenly accelerates or a rear-end collision has occurred, the lower pillow section 72 is able to move toward the seat rear side along the nape support region N of the occupant P or the occupant Q. This prevents an excessive reaction force from the lower pillow section from acting on the nape support region N during sudden vehicle acceleration or a rear-end collision, enabling both the comfort of the occupant P or the occupant Q to be improved and neck protection performance in a rear-end collision or the like to be improved.

In the vehicle seat 10 according to the present exemplary embodiment, the vertical position of the lower pillow section 72 of the headrest 14 is adjustable with respect to the upper pillow section 68 by sliding the lower pillow section 72 along the front face upper portion 12A of the seatback 12. In a state in which the lower pillow section 72 has been moved further toward the seat lower side than the uppermost position, the lower pillow section 72 is supported from the seat rear side by the front face upper portion 12A of the seatback 12, serving as a supporting seat face. This enables the vertical position of the lower pillow section 72 to be adjusted to a position where at least part of the lower pillow section 72 is alongside the nape support region N of the occupant Q, and enables the lower pillow section 72 to obtain a reaction force from the front face upper portion 12A of the seatback 12. Thus, even in cases in which the occupant Q with a smaller physical build than the occupant P is seated, the head H of the occupant Q can be stably supported from below by the lower pillow section 72.

Second Exemplary Embodiment

Explanation follows regarding a second exemplary embodiment of the present disclosure, with reference to FIG. 9 and FIG. 10. A vehicle seat 200 according to the second exemplary embodiment differs from the first exemplary embodiment in the respect that the vertical position of the lower pillow section 72 cannot be adjusted with respect to the upper pillow section 68 of a headrest 202. Note that configuration and operation that are basically the same as in the first exemplary embodiment are appended with the same reference numerals as in the first exemplary embodiment, and explanation thereof is omitted.

FIG. 9 is a perspective view schematically illustrating the upper end portion of the seatback 12 and the headrest 202 of the vehicle seat 200 according to the second exemplary embodiment of the present disclosure. FIG. 10 is an exploded perspective view schematically illustrating the headrest 202 according to the second exemplary embodiment. Note that illustration of the case section 28 is omitted from FIG. 9 for ease of explanation. Moreover, illustration of the trim covers 36, 96 is omitted from FIG. 10 for ease of explanation.

As illustrated in FIG. 9 and FIG. 10, a stay assembly 204 configuring a framework member of the headrest body 22 is configured by a headrest stay 206 and an attachment bracket 208. The headrest stay 206 is for example formed by bending a metal pipe substantially into a U shape, and is configured by a left and right pair of downward-extending legs 206A, and an upper portion 206B that couples upper end portions of the legs 206A together in the seat width direction. An upper portion of the headrest stay 206 is bent so as to be inclined toward the seat front side in side view.

The attachment bracket 208 projects toward the seat upper side at an upper end portion (the upper portion 206B) of the headrest stay 206. The attachment bracket 208 is formed by press forming sheet metal, for example, and has a substantially rectangular shaped profile in face-on view. A left and right pair of flanges 208A are provided at a lower end portion of the attachment bracket 208. The flanges 208A and the upper portion 206B of the headrest stay 206 are coupled together by a method such as welding. Through-holes (not illustrated in the drawings) are formed in an upper end portion of the attachment bracket 208 so as to correspond to the case section 28 covering an upper portion of the stay assembly 204, and the case section 28 is fixed to the attachment bracket 208 using fasteners such as bolts (not illustrated in the drawings).

The front-rear adjustment mechanism 100 configuring the lower pillow section 72 is provided between the left and right pair of flanges 208A of the attachment bracket 208. The front-rear adjustment mechanism 100 includes the bracket 100A and the friction hinge 100B, similarly to in the first exemplary embodiment. The friction hinge 100B is supported so as to be capable of swinging with respect to the headrest stay 206 such that the upper portion 206B of the headrest stay 206 serves as the rotation axis. The front-rear position of the lower pillow section 72 is thereby steplessly adjustable with respect to the upper pillow section 68, similarly to in the first exemplary embodiment described above.

In the present exemplary embodiment, the upper portion 206B of the headrest stay 206 of the headrest body 22 extends along the seat width direction and functions as the rotation axis of the lower pillow section 72. This enables the comfort of the headrest to be improved, while enabling a simpler configuration than in cases in which the rotation axis of the lower pillow section 72 is configured by a separate member. Furthermore, the number of members is reduced, thereby enabling a reduction in production costs to be realized.

The present disclosure has been explained above with reference to plural exemplary embodiments. However, various modifications may be implemented within a range not departing from the spirit of the present disclosure. Obviously the scope of rights of the present disclosure is not limited to the above exemplary embodiments.

For example, in the first exemplary embodiment, the slide guiding portions 76 are not limited to substantially angular tube shaped profiles, and may have circular tube shaped profiles. Moreover, a cross-section of the slide guiding portions 76 as viewed along the axial direction may be an open cross-section profile, such as a C shape or a U shape. Namely, it is sufficient that the legs 80A of the neck rest stay 80 are capable of being inserted inside the slide guiding portions.

In the first exemplary embodiment, the vertical position of the lower pillow section 72 with respect to the upper pillow section 68 is locked in increments by the anchor portions 84 of the slide guiding portions 76 engaging with the notches 90 of the neck rest stay 80. However, the present disclosure is not limited thereto. The vertical position of the lower pillow section 72 with respect to the upper pillow section 68 may be steplessly lockable. In such cases, for example, configuration may be made such that frictional force is generated between the slide guiding portions 76 and the neck rest stay 80, and locking is released by applying the neck rest stay 80 with a seat vertical direction external force of a pre-set value or greater. Moreover, for example, the headrest stay 38 may be configured so as to be capable of being slid in the seat vertical direction by a drive source such as an electric motor, and the vertical position of the lower pillow section 72 with respect to the upper pillow section may be adjusted by operating an operation section (such as a switch) provided to the vehicle seat.

In the headrests 14, 202 of the first exemplary embodiment and second exemplary embodiment, an upper portion of the headrest stay 38, 206 is covered by the case section 28. However, the present disclosure is not limited thereto, and a configuration that does not include the case section 28 may be applied. In such cases, configuration may be made in which a pad member is retained on a framework member of the headrest 14, 202, a recess is formed in the center of the pad member, and the vertical adjustment mechanism 70 or the front-rear adjustment mechanism 100 is disposed within this recess.

In the first exemplary embodiment and the second exemplary embodiment, the second support portion 58 is formed at the lower side of the first support portion 56 formed to the front case 30, and the first support portion 56 and the second support portion 58 are formed integrally to each other. However, the present disclosure is not limited thereto, and a configuration that does not include the second support portion 58 may be applied.

What is claimed is:

1. A headrest, comprising:
   an upper pillow section that configures a front side of an upper portion of the headrest, and that supports a head region of an occupant from a rear side of a seat; and
   a lower pillow section that configures a front side of a lower portion of the headrest and that is disposed at a lower side of the upper pillow section, a front-rear position of the lower pillow section with respect to the upper pillow section being adjustable by swinging the lower pillow section about a shaft extending along a seat width direction at an upper edge side of the lower pillow section, and a protrusion amount, by which respective seat width direction side portions of the lower pillow section protrude toward a seat front side with respect to an intermediate portion, in a seat width direction, of the lower pillow section, being adjustable with respect to the intermediate portion by swinging the respective seat width direction side portions about a shaft extending in a seat vertical direction.

2. The headrest of claim 1, wherein a vertical position of the lower pillow section is adjustable with respect to the upper pillow section.

3. The headrest of claim 2, further comprising a support panel provided at an upper side of the lower pillow section, the support panel being housed within the upper pillow section in a state in which the lower pillow section is positioned in an upper position, and at least a part of the support panel being disposed between the upper pillow section and the lower pillow section in a state in which the lower pillow section is positioned further toward the lower side than the upper position.

4. The headrest of claim 1, wherein:
   a pair of slide shafts, extending toward an upper side, extends from respective end portions of the shaft extending along the seat width direction; and
   the pair of slide shafts is slidably supported by a pair of slide guiding portions disposed at a framework member of the upper pillow section and having an axial direction along the seat vertical direction.

5. The headrest of claim 1, wherein an extension portion is formed at the lower side of the upper pillow section so as to extend toward the lower side from a rear side of the upper portion of the headrest, and to support the lower pillow section from the rear side of the seat when the lower pillow section is positioned at a rear position.

6. The headrest of claim 1, wherein the lower pillow section is joined by a friction hinge to the shaft extending along the seat width direction so as to be steplessly adjustable in a seat front-rear direction about the shaft extending along the seat width direction.

7. The headrest of claim 1, wherein the shaft extending along the seat width direction comprises an upper portion that extends along the seat width direction and configures an upper end portion of a headrest stay configuring a framework member of the upper pillow section.

8. A vehicle seat, comprising:
   a seat cushion and a seatback; and
   the headrest of claim 1, the headrest being installed at a seat upper side of the seatback.

9. The vehicle seat of claim 8, wherein:
   a vertical position of the lower pillow section is adjustable with respect to the upper pillow section by sliding the lower pillow section along a seat front face of the seatback; and
   in a state in which the lower pillow section is positioned at a lower position, the lower pillow section is supported from the seat rear side by a supporting seat face disposed at an upper portion of the front face of the seatback.

* * * * *

UNITED STATES PATENT AND TRADEMARK OFFICE
CERTIFICATE OF CORRECTION

PATENT NO. : 10,843,607 B2
APPLICATION NO. : 16/420652
DATED : November 24, 2020
INVENTOR(S) : Keiichi Kondo et al.

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Chiryu" and insert --Chiryu-shi Aichi-ken--, therefor.

Item (72), inventor 2, city, delete "Toyota" and insert --Toyota-shi Aichi-ken--, therefor.

Item (72), inventor 3, city, delete "Toyota" and insert --Toyota-shi Aichi-ken--, therefor.

Item (72), inventor 4, city, delete "Toyota" and insert --Toyota-shi Aichi-ken--, therefor.

Item (72), inventor 5, city, delete "Okazaki" and insert --Okazaki-shi Aichi-ken--, therefor.

Item (72), inventor 6, city, delete "Okazaki" and insert --Okazaki-shi Aichi-ken--, therefor.

Item (73), assignee, city, delete "Toyota" and insert --Toyota-shi Aichi-ken--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*